(No Model.)

L. S. ROCHAT.
CIRCULAR CUTTER.

No. 457,370. Patented Aug. 11, 1891.

Witnesses
Chas. H. Smith
J. Staib

Inventor
Louis S. Rochat
per Lemuel W. Serrell
Atty

UNITED STATES PATENT OFFICE.

LOUIS SAMUEL ROCHAT, OF BRASSUS, SWITZERLAND.

CIRCULAR CUTTER.

SPECIFICATION forming part of Letters Patent No. 457,370, dated August 11, 1891.

Application filed June 4, 1891. Serial No. 395,067. (No model.) Patented in Switzerland November 29, 1890, No. 2,865.

*To all whom it may concern:*

Be it known that I, LOUIS SAMUEL ROCHAT, manufacturer, of Brassus, Switzerland, have invented an Improved Circular Cutter, (for which Letters Patent have been granted to me in Switzerland, dated November 29, 1890, No. 2,865,) of which the following is a specification.

The invention relates to a circular cutter which may be used for cutting the teeth of watch wheels and pinions, the slots of small screws, the combs of musical boxes, and the like, the said cutters being made of any desired size, according to the purpose for which they are to be employed.

My invention relates to the combination, with a circular-plate cutter, of a cutter-holder having a cylindrical nave upon which the cutter fits, and a divided spring-ring also fitting upon the cylindrical nave and holding the cutter firmly in place. By this construction the spring-ring can be easily slipped on or off the nave to allow for changing the cutter, and by its contraction upon the nave the cutter is firmly held in position. For the before-named purposes the cutter will usually be smaller than represented.

Figure 1:
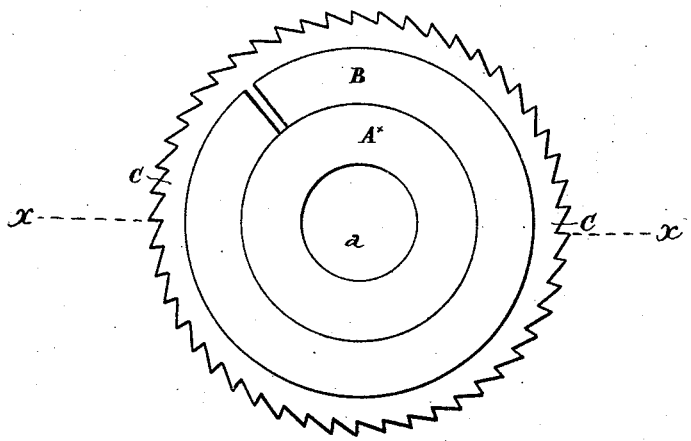
Figure 2:
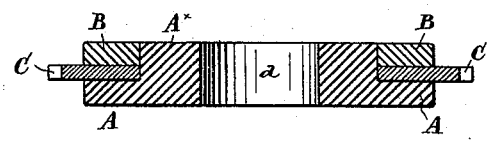

In the drawings, Figure 1 is an elevation of the cutter, and Fig. 2 is a section at the line *x x*.

The holder consists of a disk or flange A, having a cylindrical nave $A^\times$, upon which the cutter C is fitted, and a divided ring B, arranged upon the said nave $A^\times$ in such a manner that the said cutter will be clamped between the disk or flange of the holder and the divided ring B. The wheel-cutter thus constructed has substantially the same appearance as the cutters heretofore made, and is used in the same manner upon a lathe or wheel-cutting machine.

One advantage in the use of this invention is that the manufacture of the cutters is effected with a saving of about fifty per cent. of the material heretofore used. As the cutter-holder is not subject to wear, as is the case with the cutter, the said holder will outlast several of the said cutters and the same holder may be used for different-sized cutters.

Moreover, the cutters heretofore used are liable to bend or warp during the tempering operation, and such bent or warped cutters are therefore useless, as there is no means of straightening the same again. The improved cutters, however, may be used, even if they have been somewhat bent or warped by tempering, as they are always straightened when clamped between the disk or flange of the holder and the divided ring.

The tempering operation of the improved cutter is much easier than with those heretofore employed, which were made in one piece.

Having thus described my invention, I claim—

A circular cutter composed of a cutter-holder A, with nave $A^\times$, an interchangeable blade C, and a divided ring B, the blade C being inserted between the disk A and the ring B, substantially as shown and described.

In testimony whereof I have signed my name to this specification in the presence of two subscribing witnesses.

LOUIS SAMUEL ROCHAT.

Witnesses:
 ELMER SCHNEIDER,
 E. PRENTICE NAYLOR.